United States Patent [19] [11] 4,230,339

Edholm [45] Oct. 28, 1980

[54] COLLAPSIBLE WHEEL-CHAIR UNDERCARRIAGE

[76] Inventor: Emil Edholm, S-74041 Morgongåva, Sweden

[21] Appl. No.: 920,626

[22] Filed: Jun. 29, 1978

[30] Foreign Application Priority Data

Jun. 30, 1977 [SE] Sweden ................ 7707563

[51] Int. Cl.[3] ................ B62B 3/00

[52] U.S. Cl. ................ 280/647; 297/DIG. 4; 254/8 R

[58] Field of Search ................ 160/206; 414/921, 498, 414/539, 540-542; 296/19-20, 63, 65 R; 248/421; 297/DIG. 4; 5/81; 187/9 R, 11, 1 R, 17; 292/101, 103, 105; 280/647; 254/8 R

[56] References Cited

U.S. PATENT DOCUMENTS

| | | | |
|---|---|---|---|
| 1,193,893 | 8/1916 | Hammen | 187/27 |
| 1,513,234 | 10/1924 | Fritch | 292/101 |
| 2,383,340 | 8/1945 | Pezzano | 297/DIG. 4 |
| 2,912,049 | 11/1959 | Kuyper | 160/206 |
| 3,116,782 | 1/1964 | Rudnick | 160/206 |
| 3,904,853 | 9/1975 | Shoup et al. | 248/421 |
| 3,910,432 | 10/1975 | Browne et al. | 254/8 R |

FOREIGN PATENT DOCUMENTS

| | | | |
|---|---|---|---|
| 2517418 | 4/1976 | Fed. Rep. of Germany | 297/DIG. 4 |

*Primary Examiner*—Stephen G. Kunin
*Assistant Examiner*—Lawrence E. Williams
*Attorney, Agent, or Firm*—Birch, Stewart, Kolasch & Birch

[57] ABSTRACT

A collapsible wheelchair undercarriage usable as a vehicle seat includes a wheeled chassis, a seat attachment, a hauling strap for suspending the undercarriage, apparatus for movably supporting the seat attachment on the chassis, and apparatus for lifting and lowering the chassis relative to the seat attachment.

9 Claims, 4 Drawing Figures

COLLAPSIBLE WHEEL-CHAIR UNDERCARRIAGE

The present invention relates to a wheel-chair having a collapsable undercarriage, said chair being particularly suitable for the drivers of vehicles who are wheel bound.

It is previously known to provide invalid motor vehicles with controls adapted to the physical handicap of the driver. When the driver is bound to a wheel-chair, however, the driver must be helped from the wheel-chair to the driver's seat, and vice versa. Assistance is also required in placing the wheel-chair into the vehicle and removing it therefrom.

An object of the present invention is to provide a wheel-chair of novel construction, which permits a handicapped driver to place himself and the wheel-chair into the vehicle and remove himself and said chair from said vehicle without assistance. This object is realised by providing the vehicle in the neighbourhood of the driver's seat with a raisable and lowerable, rotatable lifting arm of known construction arranged to co-operate with the wheel-chair according to the invention. The original driver's seat is removed from the vehicle, thereby permitting the wheel-chair to be used as a driver's seat. To this end, the undercarriage of the wheel-chair is collapsable and the chair provided with wheels of small diameter, thereby to enable the height of the wheel-chair to be regulated when the chair is in the position of the driver's seat.

When using a wheel-chair constructed in accordance with the invention, the handicapped driver propells the wheel-chair to the vehicle, opens the door thereof and swings out the lifting arm. Anchored to the seat belt is a pair of lifting straps, which are hooked on the lifting arm and then raised so that the wheels of the wheel-chair leave the ground. Latching hooks mounted on the undercarriage of the wheel-chair are released in a manner to permit collapsable intermediate members connecting the seat belt with the chassis to be released, whereafter tension belts which are arranged on the undercarriage are caused to lift the chassis of the wheel-chair towards the seat attachment. The lifting arm together with the wheel-chair is then swung into the vehicle and the wheel-chair lowered down onto the floor thereof and securely locked. The lifting belts are then unhooked, and the lifting arms are collapsed and moved to one side. The handicapped driver is then able to close the door of the vehicle and to drive away. These steps are carried out in the reverse order when the driver is to leave the vehicle.

To make it easier for the driver to enter and to leave the vehicle, the wheel-chair is provided with a battery which is connected to both the drive motors of the wheel-chair and to a lifting motor by means of which the tensioned belts are wound onto respective wheels via a shaft mounted in the chassis. The handicapped person operates the wheel-chair by means of control means arranged on the chassis.

Figure 1:
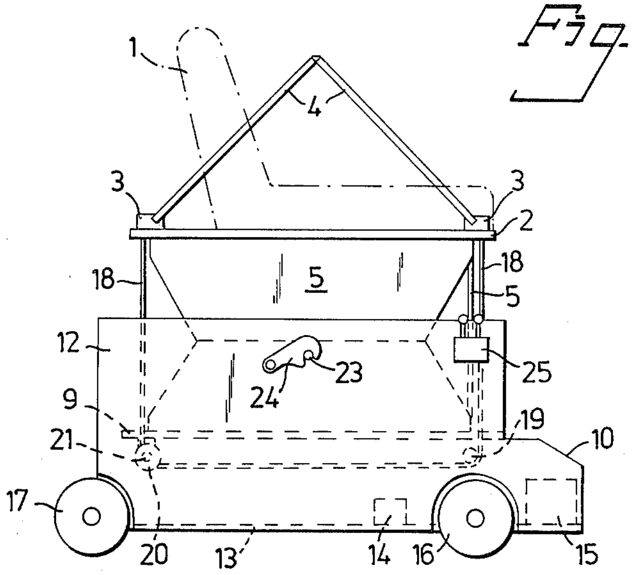
Figure 2:
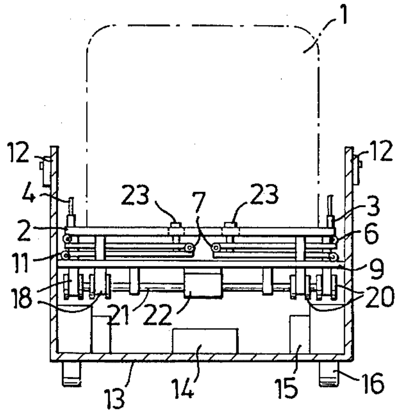
Figure 3:
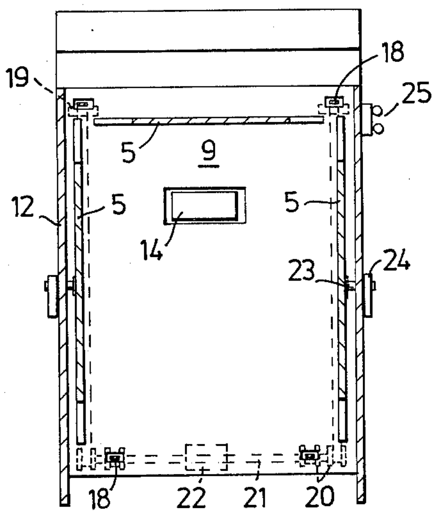
Figure 4:
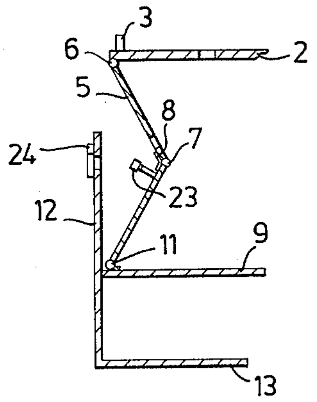

The invention will now be described with reference to the accompanying drawings, in which FIG. 1 is a side view of the wheel-chair in a collapsed state, FIG. 2 is a rear view of the wheel-chair in a uncollapsed state, FIG. 3 is a horizontal sectional view through the intermediate members of the wheel-chair, and FIG. 4 illustrates a locking arrangement.

As will be seen from the drawings, the seat 1 of the wheel-chair is mounted on a plate 2 or frame provided at the corners thereof with attachment means 3 for pairs of lifting straps 4 arranged to be hooked onto a lifting arm (not shown). Extending along and adjacent the edges on the underside of the seat attachment, although not necessarily along the rear edge thereof, are collapsable intermediate members 5 which are rotatably mounted on hinges 6. Each intermediate member comprises two, trapezoidal halves which are connected to each other along the shortest of the parallel sides by elongate hinge means 7. The trapezoidal shape of the intermediate-member halves enables the intermediate members to be folded up without interfering with each other. The hinge means are provided with springs 8 to facilitate the folding of the intermediate members. The intermediate members 5 are mounted on a horizontal plate 9 on the chassis 10 of the wheel-chair, in a manner similar to that in which the hinges 11 are mounted on the seat attachment 2 of the chair.

The plate 9 on which the intermediate members are mounted is welded to the long sides 12 of the chassis, said sides also being connected together by means of a bottom plate 13 arranged beneath the plate 9 and parallel therewith. The bottom plate 13 carries a battery 14 and drive motor 15 for respective front wheels 16. A freely running wheel 17 is pivotally mounted at the rear of the chassis.

Attached adjacent each of the lifting-belt attachments 3 is a tension band 18. The forward bands are drawn through apertures with direction rollers 19 in the plate 9 to winding rollers 20, while the rear bands are connected, via apertures in the plate, directly to respective winding rollers. The winding rollers are mounted on a common shaft 21 which is mounted on the underedge of the plate 9. The shaft is driven by an electric motor 22.

The lower intermediate-member halves mounted longitudinally of the wheel-chair are provided with a locking peg 23 which, in the collapsed position of the wheel-chair, projects out through a corresponding hole in the sides 12 of the chassis. A latch hook 24 pivotally mounted on one side of the chassis can be moved into locking engagement with a groove in the locking peg. In order to ensure that the locking peg does not prevent the wheel-chair from being collapsed, holes are arranged in the upper intermediate-member halves and in the seat attachment 2, in those cases when these are not formed with or the like. Arranged on one side of the chassis is a control means 25 for propulsion of the wheel-chair and for collapsing the same. The undercarriage of the chair is provided with an electric switch means which is energised when the undercarriage is fully collapsed or fully extended.

When using the wheel-chair according to the invention, the lifting straps 4 are hooked onto a lifting arm and then lifted somewhat. The latching hooks 24 are moved out of engagement with the locking pegs 23. The springs 8 force the hinge means 7 common to the intermediate-member halves slightly inwardly towards the centre of the chassis, thereby not to jeopardize the folding of the intermediate members. The electric motor 22 is started by manipulating the control means 25, thereby rotating the shaft 21 with the winding rollers 20. In this way, the tension bands 18 are wound up onto the rollers, the intermediate members are folded against the centre of the undercarriage and the chassis 10 is moved in a path parallel to the seat attachment 2. When the intermediate members are fully collapsed, a switch means breaks the supply of current to the electric motor and the lifting arm with the collapsed wheel-chair can be swung into the vehicle. The seat 1 is now enclosed between the longitudinally extending sides 12 of the chassis, and hence the height of the undercarriage is slightly higher than the height of the plate 9 carrying the intermediate members. There is no front plate between the longitudinally extending sides 12 and over the plate 9 which would be liable to limit the extent to which the chair can be folded.

The undercarriage of the wheel-chair is extended from the collapsed position in a similar manner. The electric motor 22 is started and the chassis removed from the seat attachment 2 gravitationally. When the intermediate members 5 are fully extended, a switch means breaks the current to the electric motor, to prevent the tension bands from being wound up in a reverse direction on the winding rollers. The locking pegs 23 extend out of the holes in the sides 12 of the chassis and the latch hooks 24 are moved into latching position with said pegs. The wheel-chair is then lowered to the ground, the lifting straps 4 are removed from the lifting arm and the wheel-chair is ready for movement along the ground. The undercarriage of the wheel-chair shall be of a robust and firm construction, and is suitably made of light metal.

Although the wheel-chair has been described with reference to its use in motor vehicles, it may also be used in conjunction with other vehicles or in other contexts where a collapsable wheel-chair can be of use to facilitate movement of a handicapped person.

I claim:

1. A collapsible wheelchair undercarriage which comprises a seat attachment, a wheeled chassis and collapsible intermediate members movably supporting said seat attachment on said wheeled chassis, said seat attachment being provided with means for suspending said wheelchair undercarriage, and hauling strap means located between and attached to said seat attachment and said chassis for lifting and lowering said chassis relative to said seat attachment.

2. The collapsible wheelchair of claim 1, wherein the collapsible intermediate members are pivotally connected to said seat attachment and said chassis.

3. The collapsible wheelchair of claim 2, wherein the collapsible intermediate members comprise two members, each member having a trapezoidal configuration, said members being pivotally connected to each other along their shortest base and pivotally connected to the seat attachment and the wheeled chassis, respectively, along their longest base.

4. The collapsible wheelchair undercarriage according to claim 1, 2 or 3, wherein said hauling strap means comprises at least one belt attached to said seat attachment and operatively associated with at least one winding roller mounted on said wheeled chassis.

5. The collapsible wheelchair of claims 1, 2 or 3, wherein the hauling strap means comprises at least two belts operatively attached to opposite sides of said seat attachment and operatively associated with winding roller means mounted on a common shaft disposed in said wheeled chassis.

6. The collapsible wheelchair of claims 1, 2 or 3, wherein locking means is provided for locking the collapsible intermediate members to the wheeled chassis when said collapsible intermediate members are in their extended state.

7. The collapsible wheelchair undercarriage according to claim 6, wherein the intermediate members are provided with the locking means which projects through a hole in said wheeled chassis and is held in position by a latching means mounted on said chassis.

8. The collapsible wheelchair undercarriage according to claim 3, wherein said intermediate members are connected together by spring-loaded hinge means.

9. A wheelchair undercarriage of claim 8 in combination with an arm means operatively mounted on a vehicle for lifting and lowering said wheelchair undercarriage.

* * * * *